(12) United States Patent
McKenzie et al.

(10) Patent No.: US 7,588,514 B2
(45) Date of Patent: Sep. 15, 2009

(54) METHOD FOR CONTROLLING ENGINE BRAKING IN A VEHICLE POWERTRAIN

(75) Inventors: Ian D. McKenzie, Kalamazoo, MI (US); Craig S. Jacobs, Canton, MI (US)

(73) Assignee: Eaton Corporation, Cleveland, OH (US)

( * ) Notice: Subject to any disclaimer, the term of this patent is extended or adjusted under 35 U.S.C. 154(b) by 387 days.

(21) Appl. No.: 11/318,656

(22) Filed: Dec. 27, 2005

(65) Prior Publication Data

US 2007/0149341 A1 Jun. 28, 2007

(51) Int. Cl.
*F16H 61/21* (2006.01)

(52) U.S. Cl. .............................. 477/47; 477/41; 475/209

(58) Field of Classification Search ..................... 477/41
See application file for complete search history.

(56) References Cited

U.S. PATENT DOCUMENTS

| | | | |
|---|---|---|---|
| 4,644,820 A | 2/1987 | Macey et al. | |
| 5,383,812 A | 1/1995 | Tibbles | |
| 5,514,047 A | 5/1996 | Tibbles et al. | |
| 5,679,085 A | 10/1997 | Fredricksen et al. | |
| 5,961,418 A | 10/1999 | Taniguchi et al. | |
| 6,080,080 A | 6/2000 | Bolz et al. | |
| 6,908,412 B2 | 6/2005 | Kurabayashi | |
| 2001/0039231 A1 | 11/2001 | Van Lith et al. | |
| 2003/0125154 A1* | 7/2003 | Miyata et al. | 475/208 |
| 2003/0150683 A1 | 8/2003 | Hoshiya et al. | |
| 2004/0127321 A1 | 7/2004 | Morscheck | |
| 2005/0197233 A1 | 9/2005 | Hoshiya et al. | |

FOREIGN PATENT DOCUMENTS

| | | |
|---|---|---|
| DE | 102 48 400 A1 | 10/2002 |
| DE | 102 48 400 A1 | 4/2004 |
| EP | 0 736 407 A2 | 10/1996 |
| EP | 0 895 006 A1 | 2/1999 |
| EP | 1 378 647 A1 | 1/2004 |
| EP | 1 378 647 A1 | 7/2004 |
| GB | 2 316 142 A | 2/1998 |

OTHER PUBLICATIONS

International Search Report for PCT/IB2006/003761 dated Sep. 28, 2007.

* cited by examiner

*Primary Examiner*—Sherry L Estremsky
*Assistant Examiner*—Edwin A. Young
(74) *Attorney, Agent, or Firm*—Brooks Kushman P.C.

(57) ABSTRACT

A method is disclosed for controlling engine braking horsepower for a power transmission mechanism in a vehicle powertrain. The transmission mechanism has multiple-ratio gearing and a continuously variable transmission unit arranged in parallel disposition. A target engine speed during an engine braking mode is maintained by controlling the ratio of the continuously variable transmission unit.

3 Claims, 6 Drawing Sheets

METHOD FOR CONTROLLING ENGINE BRAKING IN A VEHICLE POWERTRAIN

BACKGROUND OF THE INVENTION

1. Field of the Invention

The invention relates to a vehicle powertrain having at least one torque flow path defined by an infinitely variable transmission.

2. Background Art

Heavy-duty powertrains with fixed ratio gearing, such as powertrains used for heavy-duty trucks, use an engine compression braking technique. Such trucks typically are equipped with wheel friction brakes to complement the compression braking of the engine, but engine compression braking alone ideally would be used by a trucker at moderate and high road speeds. Engine compression braking is less effective at lower road speeds.

Braking horsepower is developed by the friction of the engine and by compression energy developed by reciprocating pistons of the engine. During operation at high engine speed, the frictional braking horsepower is increased, as well as the compression energy. In those instances when the engine is operating with one or more cylinders disabled, the total braking horsepower can be increased further by enabling selectively the engine cylinders. Braking horsepower increases as each cylinder is enabled. To augment the braking horsepower, an engine cooling fan may be enabled to provide still more braking horsepower. As in the case of engine braking horsepower, cooling fan braking horsepower increases with increased engine speed.

Since the total engine braking horsepower is a function of engine speed, a geared transmission with discrete ratios will provide little flexibility in controlling the engine speed. This makes it difficult to provide adequate control of engine braking horsepower.

SUMMARY OF THE INVENTION

The shortcomings of a conventional engine braking horsepower control for vehicle powertrains are avoided by the engine braking horsepower control technique of the present invention. This involves use of a continuously variable transmission (CVT), sometimes referred to as a variator, to establish a torque flow path from the engine to the vehicle traction wheels that is separate from the torque flow path established by discrete ratio gearing for a given vehicle speed. In one embodiment of the invention, the CVT may be a variable sheave drive with a drive chain. The engine speed, and therefore the engine braking horsepower, is optimized by a powertrain controller that controls the speed ratio of the continuously variable transmission. A heavy-duty truck transmission capable of embodying the engine braking horsepower control technique is disclosed in U.S. Patent application publication US2004/0127321. That disclosure, which is assigned to the assignee of the present invention, is incorporated herein by reference.

As the speed ratio of the discrete ratio transmission gearing changes, the ratio of the continuously variable transmission is changed so that a target engine speed is maintained during engine braking. Each change in ratio of the transmission gearing is accompanied by a ratio change in the continuously variable transmission.

The continuously variable transmission is controlled by the powertrain controller during engine braking at low vehicle speeds (e.g., speeds less than 15 mph) so that a calibrated torque limit for the continuously variable transmission is not exceeded. Further, as the continuously variable transmission is used to maintain a target engine speed during engine braking, the powertrain controller will prevent the speed of torque delivery components (e.g., the CVT drive chain) from exceeding a calibrated speed limit.

PARTICULAR DESCRIPTION OF INVENTION

Figure 1:
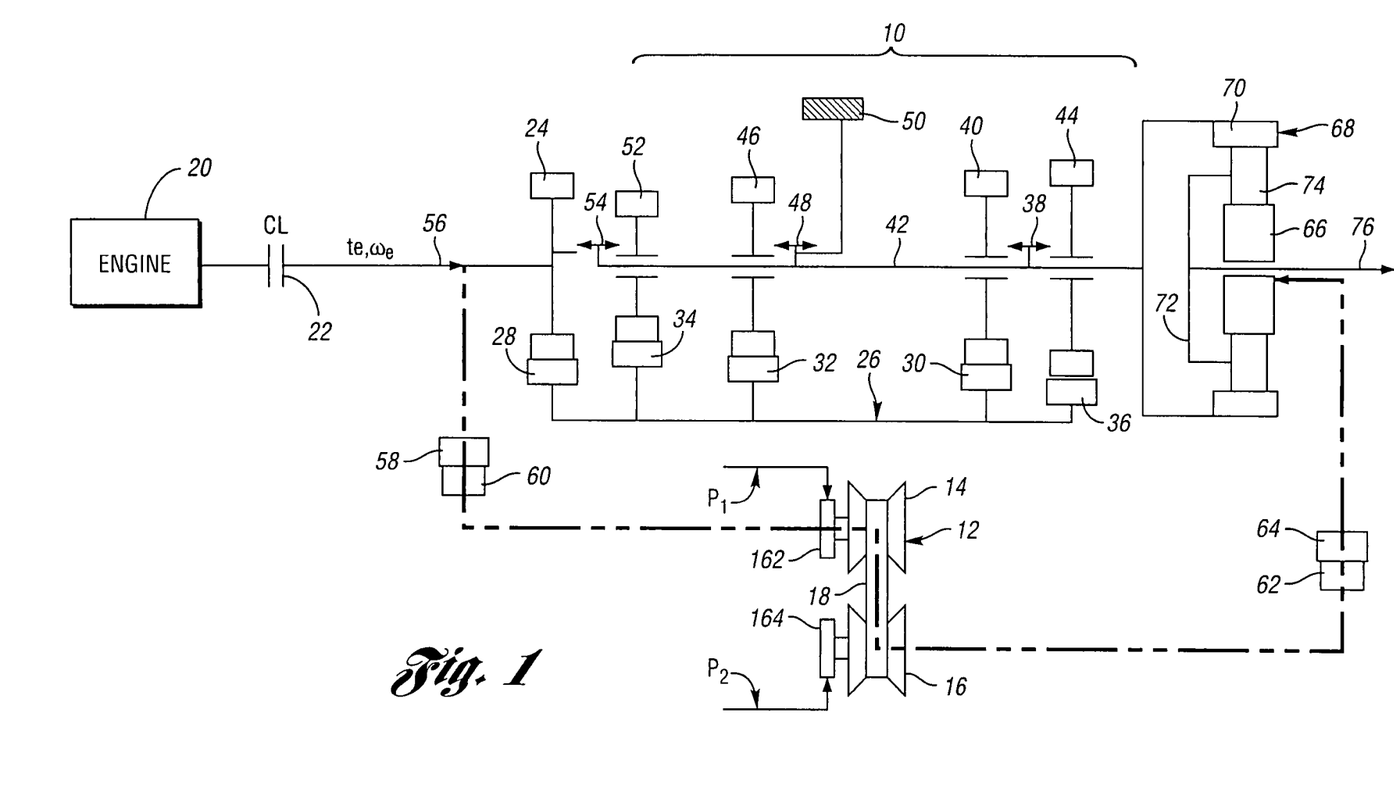
FIG. 1 is a schematic drawing of a heavy-duty transmission that comprises multiple-ratio gearing and an infinitely variable transmission in the form of a sheave and chain assembly situated in parallel with the gear elements of the geared transmission, including a torque flow path established during operation in a low ratio drive mode.
Figure 2:
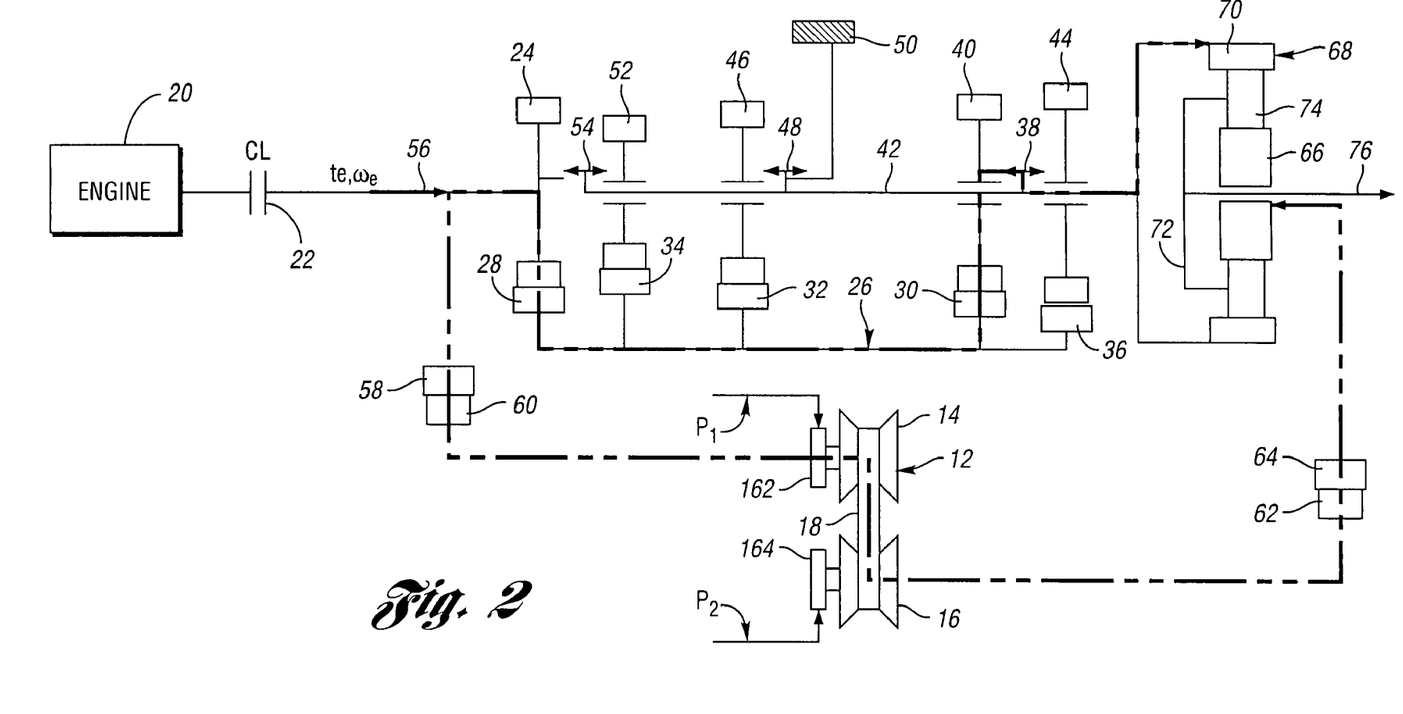
FIG. 2 is a schematic drawing of the transmission of FIG. 1 wherein the torque flow path is a power split torque flow path as torque is delivered from the engine through both the infinitely variable transmission (variator) and the multiple-ratio gearing.
Figure 3:
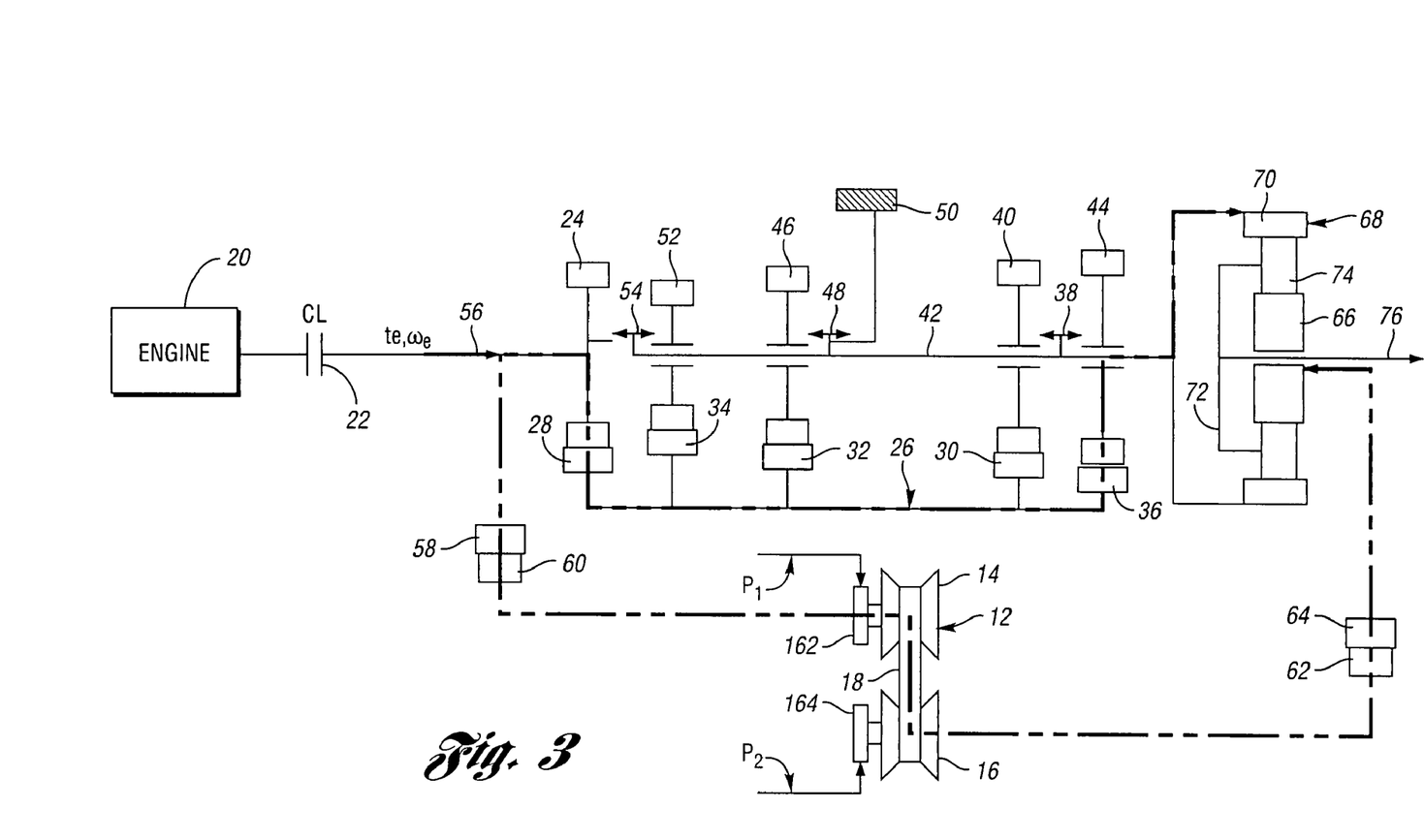
FIG. 3 is a schematic drawing of the transmission of FIG. 1 wherein a forward curbing speed and a reverse drive mode can be established.

In FIGS. 1, 2 and 3, a multiple-ratio geared transmission is schematically shown at 10 and an infinitely variable transmission (variator) is schematically shown at 12. In the embodiment that will be described, the infinitely variable transmission 12 is a variable sheave drive with a power input sheave 14 and a power output sheave 16. The sheaves are drivably coupled by a drive chain 18. Variable sheave drives of this kind are well known. An example is disclosed in U.S. Pat. No. 4,644,820.

Although a sheave drive is disclosed, other infinitely variable transmissions could be used in an environment such as that illustrated in FIG. 1. For example, the infinitely variable transmission could be a toroidal drive, such as the Perbury traction transmission described in an ASME Paper by P. W. R. Stubbs, dated August, 1980, entitled "The Development of a Perbury Traction Transmission for Motor Car Applications."

The powertrain of FIGS. 1, 2 and 3 includes an engine 20, which may be a diesel heavy-duty engine designed to operate at relatively constant speed in a wide operating road speed range.

The output power of the engine is distributed through a master clutch 22 to a torque input gear 24 of the transmission 10. A countershaft gear assembly, indicated generally at 26, comprises torque input countershaft gear 28 and forward drive countershaft gear elements 30, 32 and 34. A reverse countershaft gear element is shown at 36.

A first ratio and reverse ratio drive clutch 38, which may be a slidable dog clutch assembly or a synchronizer clutch assembly depending upon a design choice, drivably connects a first ratio gear 40 to main shaft 42 when it is shifted in a left direction, as seen in FIG. 1. When it is shifted in a right direction, as viewed in FIG. 1, a reverse gear 44 is drivably connected to main shaft 42. Reverse gear 44 meshes with a reverse drive pinion (not shown). The reverse drive pinion engages also reverse gear element 36 of the countershaft gear assembly 26.

A second ratio gear 46 mounted on the main shaft 42 is selectively connected to the main shaft 42 by clutch 48 when the clutch 48 is shifted in the left-hand direction. When the clutch 48 is shifted in the right-hand direction, it connects main shaft 42 to a stationary housing portion 50 of the transmission 10, thereby anchoring the main shaft 42.

A third ratio gear 52 mounted on main shaft 42 is in meshing engagement with third ratio gear element of the countershaft gear assembly 26. Gear 42 can be connected to main shaft 42 by shifting clutch 54 in a right-hand direction.

A fourth ratio for the transmission 10 can be established by shifting the clutch 54 in a left-hand direction, thereby drivably connecting the main shaft 42 with torque input gear 24, which establishes a direct torque flow path from the power input shaft 56 of the engine 20.

Power input shaft 56 is drivably connected to torque transfer gear 58, which meshes with continuously variable transmission input gear 60. Torque input sheave 14 of the infinitely variable transmission 12 is connected drivably to the gear 60.

The continuously variable transmission 12 may be similar to the continuously variable transmission disclosed in U.S. Pat. Nos. 6,908,412 and 6,080,080. Reference may be made to those prior art patents for purposes of this specification.

The chain 18 of the continuously variable transmission may be replaced by a belt depending upon a design choice. The terms "belt",and "chain" often are referred to interchangeably as indicated, for example, in U.S. Pat. No. 5,961,418 where a chain is disclosed but is described as a belt. A chain drive with steel segments or pins, which are disposed parallel to the axes of the sheaves and linked together, typically has a higher torque capacity than other known constructions.

The torque output sheave 16 is drivably connected to torque output gear 62 of the continuously variable transmission 12. Gear 62 meshes with gear 64, which is drivably connected to sun gear 66 of a torque mixer or torque splitter gear assembly 68.

Gear assembly 68 comprises a ring gear 70, a torque output carrier 72 and planet pinions 74, which drivably engage ring gear 70 and sun gear 66. Carrier 72 is a torque output element, which is connected to torque output shaft 76.

A torque flow path is illustrated in FIG. 1. This is the torque flow path that is established during operation in a so-called low mode. Torque is delivered from the engine 20 and through engaged clutch 22 to the sun gear 66 through the continuously variable transmission 12. The gears of the multiple-ratio transmission 10 are not in this torque flow path. Thus, during the so-called low mode operation, there are no torque interrupted shifts when the vehicle operates from zero speed to about 15 miles per hour. All of the driving power is transmitted through the continuously variable transmission or variator. This latter term will be used in this description hereafter.

The ring gear 70 is anchored to the housing 50 by the clutch 48. Sun gear 66 thus acts as a torque input element and the carrier acts as a torque output element. Torque flow from the engine can selectively be established and disestablished by the vehicle operator using the master clutch 22.

When the transmission is operated at speeds in excess of 15 miles per hour up to a selected road speed, there may be four conventional shifts in the transmission 10. This mode of operation, which as illustrated in FIG. 2, is referred to as a power split mode. A part of the power is distributed through the variator and the balance is distributed through the transmission 10 during operation in the power split mode. The torque distribution is shared by both transmission 10 and the variator 12. Efficiency of the overall transmission system increases as vehicle speed increases.

To establish a first gear ratio in the power split mode, clutch 38 is shifted in a left-hand direction, thereby connecting gear 40 to main shaft 42. Engine torque then is delivered through gear 24, gear element 28 and through the countershaft gear assembly 26 to gear 40. This drives the ring gear 70 as variator torque is distributed through the sun gear 66. Thus, there are two torque input elements for the mixer or torque splitter 68 as carrier torque is distributed to the torque output shaft 76.

To shift to the second ratio of the transmission 10, clutch 38 is returned to its neutral position and clutch 48 is shifted in a left-hand direction, thereby connecting gear 46 to shaft 42. Countershaft gear 32 then delivers torque to gear 46, which drives main shaft 42 and ring gear 70 of the mixer 68, thus driving output shaft 76 with a higher speed ratio.

A shift from the second ratio to the third ratio in the transmission 10 is achieved by shifting clutch 48 out of engagement with gear 46 to a neutral position while shifting clutch 54 in a right-hand direction to drivably connect gear 52 to the main shaft 42. Torque then is distributed from the countershaft gear element 34 to the gear 52 and through the clutch 54 to the main shaft 42, which drives the ring gear 70 with a higher speed ratio.

A shift from the third ratio to the fourth ratio in the transmission 10 is achieved by shifting clutch 54 in a left-hand direction, thereby directly connecting shaft 56 with main shaft 42.

FIG. 3 illustrates the power flow path when the transmission is conditioned for forward drive curbing operation and reverse drive. During operation in this mode, clutch 38 is shifted in a righthand direction, thereby connecting reverse gear 44 to the main shaft 42. Countershaft gear element 36 then drives gear 44 and main shaft 42 in a reverse direction as reverse torque is delivered to the main shaft through the reverse pinions. During operation of the transmission in the forward curbing drive mode, the sun gear 66 of the mixer gear 68 unit is driven in a forward direction as the ring gear 70 is driven in a reverse direction. It is apparent, therefore, that carrier 44 may be driven with an infinite number of ratios beginning with a ratio of infinity, which exists during a so-called geared-neutral state, to a maximum ratio that depends upon the relative pitch diameters of the elements of the mixer gear unit 68. An example of a geared-neutral state is disclosed in U.S. Pat. No. 4,644,820. This variation in ratio is achieved by adjusting the ratio of the variator.

If the reverse motion of the ring gear 70 and the forward motion of the sun gear 66 established by variator 12 results in a near-zero speed of the carrier 72, theoretically the transmission ratio would approach infinity. If the ring gear speed should increase further relative the speed of sun gear 66, the transmission would enter a reverse drive mode. This condition is not preferred, however, since gear tooth loading as the mixer transitions through the geared-neutral state, could be excessively high. For this reason, the reverse gearing shown at 36 and 44 is used to establish reverse drive.

Figure 4:
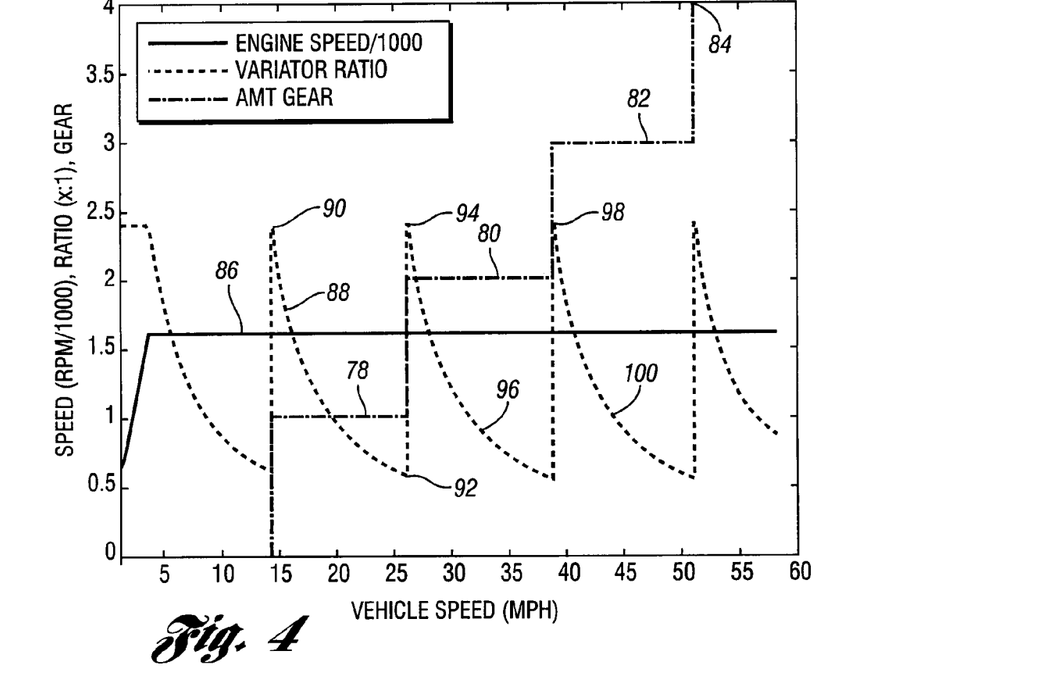
FIG. 4 is a plot of engine speed, overall ratio and the transmission gear as a function of vehicle speed wherein the transmission is a four-speed transmission.

The plot of FIG. 4 illustrates the shift sequence that is available for the transmission described with reference to FIGS. 1, 2, and 3. The ratio steps for the transmission 10 are indicated in FIG. 4 by reference numerals 78, 80, 82, and 84, which correspond respectively to the first, second, third, and fourth ratio previously described.

Although the transmission of FIGS. 1, 2, and 3 is a four-speed transmission characterized by the four ratio steps, seen in FIG. 4, a transmission with 3, 6, 10, or 18 speed ratios, for example, could be used as well.

The engine speed is held constant as shown at 86, which is typical of a diesel engine. The variator ratio is plotted in FIG. 4 at 88 for the first speed ratio of transmission 10. During operation in the first speed ratio 78 of the transmission 10, the variator ratio will assume the underdrive position, shown at 90, at a vehicle speed of approximately 15 miles per hour. As the vehicle speed is increased, the variator ratio will change as shown at 88 until point 92 is reached. If the vehicle speed is increased further, the transmission 10 will be shifted to the second ratio 80. The engine speed will remain constant because of the variability in the effective overall ratio obtained by the changing ratio of the variator as shown at 88.

When the transmission is shifted from the second ratio to the third ratio, the variator is repositioned to effect an underdrive condition at 94. As the vehicle speed increases, the variator sheaves will be adjusted to an overdrive position as indicated at 96. If the transmission is operating in its second ratio, the sheaves of the variator will be adjusted to the underdrive position to produce a ratio as shown at 98. Again, the engine speed is held constant as the variator ratio changes toward an overdrive state as shown at 100. The same sequence then is followed when a shift is made from the third ratio 82 to the fourth ratio 84.

Figure 5:
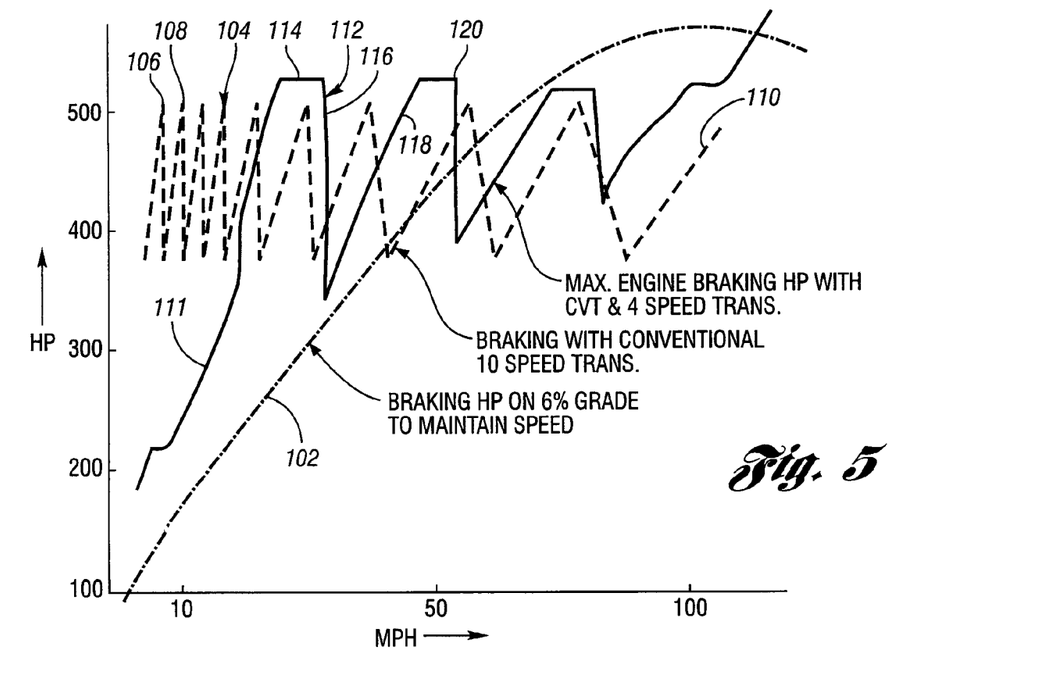
FIG. 5 is a plot of engine braking horsepower as a function of vehicle speed for a transmission with the infinitely variable transmission control feature of the invention, as well as a plot of braking horsepower using a conventional 10 speed discrete ratio transmission in a comparable powertrain.

FIG. 5 shows a plot at 102 for the horsepower required on a six percent grade to maintain a given speed. This is done for purposes of illustration only. Characteristic plots for other vehicles and for other grades can similarly be plotted. As the grade decreases, the horsepower curve would be lower than the plot 102.

For the purpose of comparing the engine braking characteristics of a conventional ten speed geared transmission with the braking characteristics of a transmission embodying the present invention using four-speed gearing and a four cylinder diesel engine, there is plotted at 104 the braking horsepower for each of ten geared ratios of a conventional ten-speed geared transmission. The braking horsepower, when the transmission is in the first ratio, is indicated at 106 in the example illustrated in FIG. 5 when the road speed is approximately 5 miles per hour. When the geared transmission operates in the second ratio, the braking horsepower is shown at 108. Successive ratio changes can be made by disengaging the master clutch and shifting the gearing, and then reengaging the master clutch. In each ratio, beginning with the first ratio and continuing to the tenth ratio as shown at 110, the braking horsepower may vary from about 500 horsepower to about 375 horsepower.

A braking horsepower plot for a transmission embodying the present invention is indicated with a solid line plot at 112. In the case of the plot 112 in FIG. 5, the transmission is a four-speed transmission. When the geared transmission has four forward ratios and the vehicle speed is low, the braking horsepower is controlled by the variator with the ring gear 70 of the four speed geared transmission mixer held stationary by brake 50. This is indicated at 111. The variator ratio may be held at an underdrive ratio (e.g. 2.4) until a target braking speed is reached at 114. At that time, the variator ratio is changed in order to hold the target braking speed until a maximum variator chain speed is reached.

The controller, which will be described with reference to FIG. 8, will limit the chain speed to avoid damage to the chain. When the chain speed limit is reached, the controller will initiate a shift of the four-speed transmission to the second ratio. When the geared transmission is operating in the second ratio, the variator sheaves will slew at 116 toward underdrive. The variator ratio is held at the desired underdrive ratio as indicated at 118 until a target engine speed is reached at 120. The variator ratio then is changed in order to maintain the target engine speed as the road speed increases. This pattern is followed by subsequent shifts to the second, third or fourth ratios as indicated by the plot of FIG. 5.

The controller will adjust the variator ratio so that the torque transmitted through the variator at low road speeds (e.g., less than 10 mph) will be limited to a calibrated value. This torque limitation feature will avoid the conditions under which the plot at 111 in FIG. 5 would be shifted to the left. In this way, damage to the variator due to excess torque is avoided.

It is apparent from the plot of FIG. 5 that during high road speed operation the overall engine braking performance is comparable and somewhat superior to the engine braking performance of a ten speed geared transmission. At road speeds below approximately 24 miles per hour, the engine braking performance of the transmission of FIGS. 1, 2, and 3 is somewhat inferior, but its braking performance is acceptable. At road speeds in the intermediate speed range, the engine braking performance of the transmission of FIGS. 1, 2, and 3 is only slightly inferior, but still acceptable.

Figure 6:
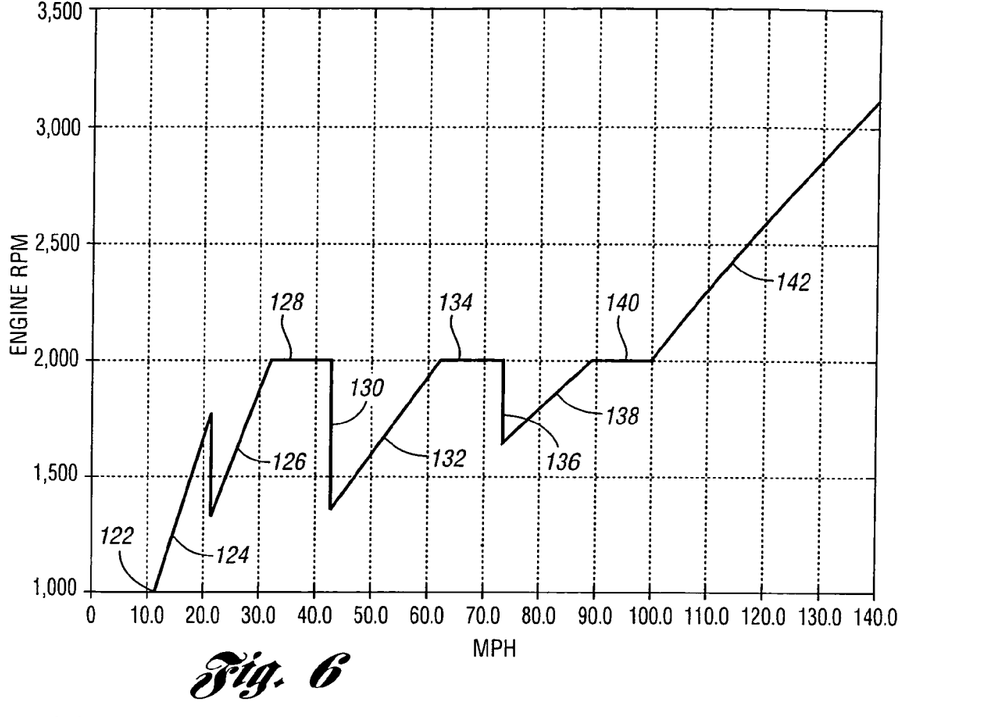
FIG. 6 is a plot of engine braking strategy at various vehicle speeds for a three speed transmission of the type shown in FIGS. 1-3.

FIG. 6 shows a plot of engine rpm versus road speed, which illustrates the maximum engine braking capacity and operating strategy for the transmission of FIGS. 1, 2, and 3. The geared transmission in the powertrain corresponding to the plot of FIG. 6 is a three-speed, geared, heavy-duty truck transmission. During operation in the low mode, illustrated in FIG. 1, the variator ratio is changed to hold a minimum engine braking speed as shown at 122. At 124, during operation in the low mode illustrated in FIG. 1, variator ratio is held at 0.8 to maximize the torque until the maximum engine speed or a maximum chain speed is reached. The low engine braking horsepower at low speed is not a concern since the vehicle demand for torque is low at low vehicle speeds. The variator cannot tolerate high torque in the low mode in any event. The variator thus can be used by the powertrain controller to regulate engine speed. It can be used also by powertrain controller to limit the maximum chain speed. Once the variator ratio is such that the low mode maximum torque limit is achieved (e.g., between ratios of 0.8 and 1.2), the ratio is held to allow the engine speed to increase. This is indicated at 124.

An example of a relationship of variator ratio and maximum torque limit is demonstrated by the following table of calibrated values:

| Variator Ratio | Max Torque |
|---|---|
| 0.4 | 982 Lb Ft |
| 0.5 | 1,044 |
| 0.6 | 1,192 |
| 0.7 | 1,230 |
| 0.8 | 1,257 |
| 0.9 | 1,254 |
| 1.0 | 1,239 |
| 1.2 | 1,216 |
| 1.4 | 1,168 |
| 1.6 | 1,041 |
| 1.8 | 941 |
| 2.0 | 859 |
| 2.2 | 794 |
| 2.4 | 738 |

It is apparent from this table that less torque is allowed through the variator at the extreme ratios (e.g., 0.4 and 2.4) than at intermediate ratios. That is because the number of steel segments or pins in the chain that frictionally contact the torque input sheave are fewer during operation at the extreme ratio of 2.4 than during operation at lower ratios. That is due to the small effective pitch diameter of the torque input pulley. Likewise, fewer steel segments or pins in the chain frictionally contact the torque output sheave during operation at the extreme ratio of 0.4 than during operation at higher ratios. Fewer steel segments or pins, which frictionally contact the sheaves, will transfer less torque. Thus, the method of the invention during operation in the low mode includes controlling variator ratio to maximize the amount of allowable torque that can be transmitted through the variator. This control method can be used as well during positive torque delivery through the variator, not just during engine braking of the vehicle.

When the transmission is conditioned for the first ratio power split mode, the variator ratio is held at 2.4, as indicated at 126, until a target engine braking speed is reached at 128. At that time, the variator ratio is changed in order to hold the target engine braking speed relatively constant until a maximum chain speed is reached. At that time, it is changed, as shown at 130, as the transmission is shifted to the next ratio. Theoretically, the engine speed shown at 128 could be maintained at a constant value throughout a broad road speed range using the variator. The speed limitations of the chain, however, make that unfeasible, so the transmission must be shifted as shown at 130.

During operation in the second ratio power split mode, the variator ratio again is held, as shown at 132, until the target engine braking speed is reached at 134. Again, the variator ratio is changed, as shown at 136. As the transmission is shifted to the third ratio power split mode, the variator ratio again is held constant at 2.4, as shown at 138, until the target engine braking speed is reached at 140. Again, the variator ratio is changed in order to hold the engine braking speed until the maximum chain speed is reached. At 142, the variator ratio is changed in order to hold a maximum chain speed as engine speed increases.

Figure 7:
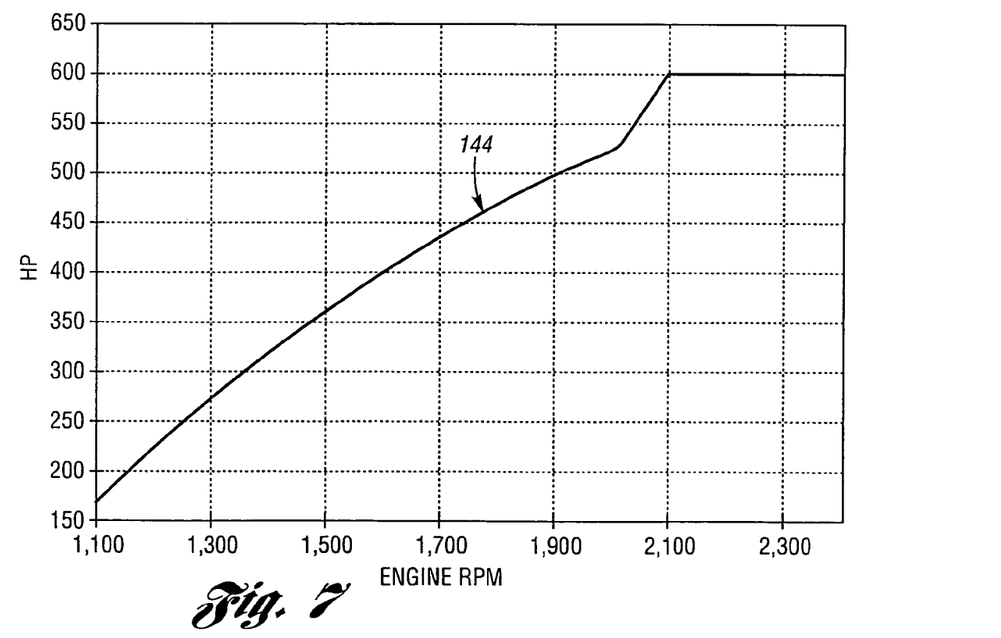
FIG. 7 is a plot of engine braking horsepower as a function of engine speed that is assumed using the strategy illustrated in FIG. 6.

For purposes of the performance plot of FIG. 6, it has been assumed that the engine braking horsepower will change as shown at 144 in FIG. 7, where the engine speed changes from 1100 rpm to its maximum value of about 2300 rpm.

Figure 8:
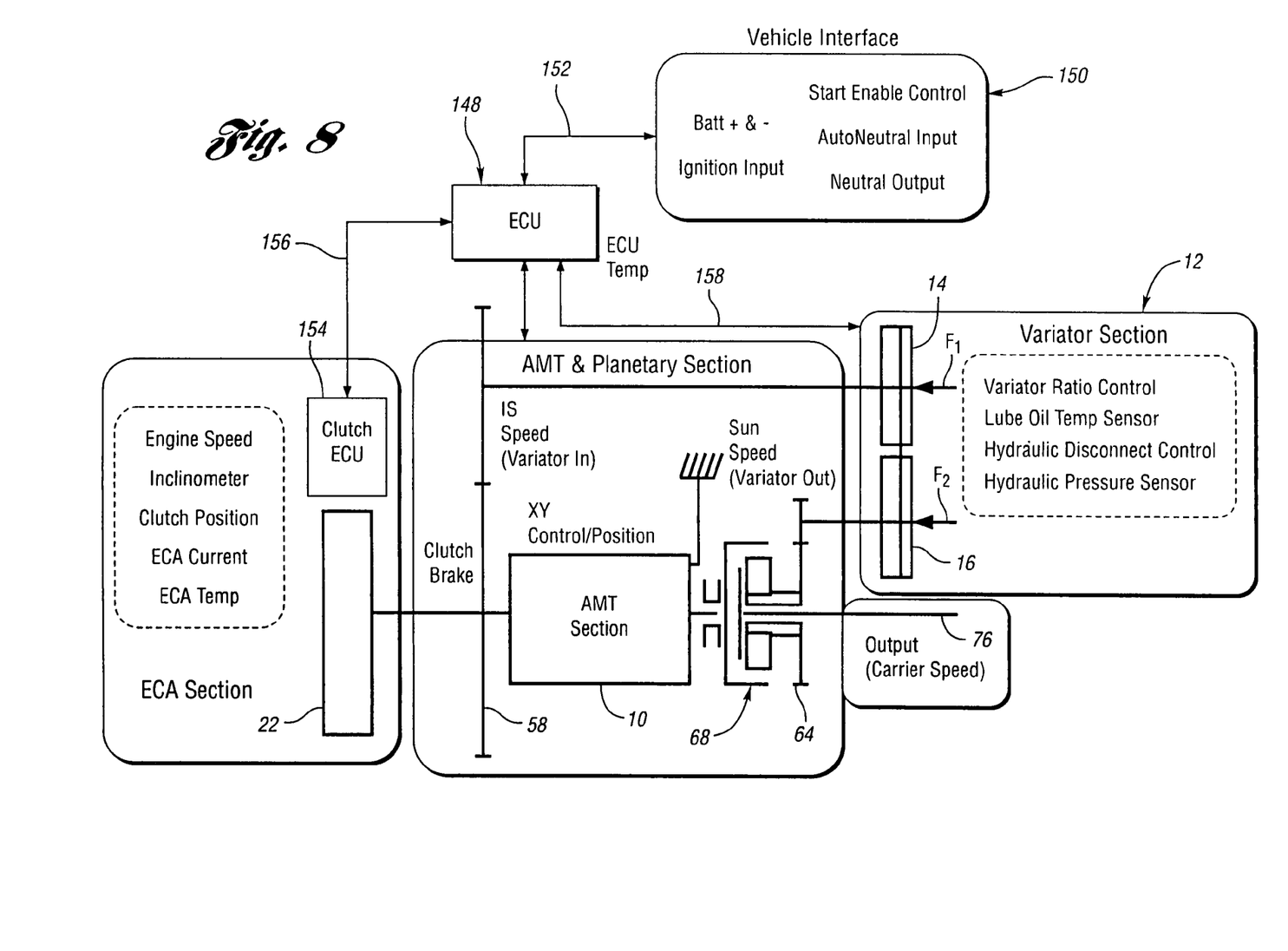
FIG. 8 is a schematic representation of an overall control system for the heavy-duty powertrain of FIGS. 1-3.

FIG. 8 is a general overall schematic of the control system for the transmission of FIGS. 1, 2, and 3. The control system is under the control of an electronic control unit (ECU) 148, which is in electrical communication with a vehicle interface module 150 through data link 152. It is in communication also with a clutch control submodule 154 through data link 156. Vehicle driver inputs, such as torque commands and master clutch position, are received by ECU 148. Variator ratio and variator hydraulic pressures are controlled by the variator section 12 in accordance with instructions from the controller 148 received through data link 158. Temperature and hydraulic pressure sensors distribute data to the ECU 148 through the data link 158. Similarly, submodule 154, which is part of the clutch control section (ECA section), responds to operating variables as indicated in FIG. 8. These include engine speed, clutch position, clutch current, clutch temperature and an inclinometer reading.

The pressure forces $F_1$ and $F_2$, seen FIG. 8, which are developed by pressures $P_1$ and $P_2$ applied to actuators 162 and 164 seen in FIGS. 1-3, are controlled by the variator ratio control of the variator section 12 in response to control commands from the ECU 148 seen in FIG. 8.

Although an embodiment of the invention has been disclosed, it will be apparent to a person skilled in the art that modifications may be made without departing from the scope of the invention. All such modifications and equivalents thereof are intended to be covered by the following claims.

What is claimed is:

1. A method for controlling engine braking in a power transmission mechanism for a vehicle powertrain, the transmission mechanism comprising multiple-ratio gearing, a mixer gear unit connected to a power output element and a continuously variable transmission unit, the multiple-ratio gearing and the continuously variable transmission unit defining parallel driving torque flow paths from an engine, the method comprising:

establishing an engine braking power delivery path from the power output element to the engine through the multiple-ratio gearing;

changing the ratio of the continuously variable transmission unit toward an overdrive ratio as each of the ratios of the multiple-ratio gearing is established during engine braking for conditioning the continuously variable transmission unit for effecting optimum engine braking horsepower for a range of vehicle speeds; and controlling the continuously variable transmission unit ratio to effect and hold a target engine braking speed.

2. The method set forth in claim 1 wherein the step of controlling the continuously variable transmission unit is preceded by the step of holding the ratio of the continuously variable transmission unit relatively constant following a ratio change in the multiple-ratio gearing until a target engine braking speed is achieved.

3. The method set forth in claim 2 including the step of varying the ratio of the continuously variable transmission unit when the target engine braking speed is established as vehicle speed changes until a limiting speed for the continuously variable transmission unit is reached, which is followed by a subsequent ratio change in the gearing.

\* \* \* \* \*

UNITED STATES PATENT AND TRADEMARK OFFICE
CERTIFICATE OF CORRECTION

PATENT NO. : 7,588,514 B2
APPLICATION NO. : 11/318656
DATED : September 15, 2009
INVENTOR(S) : McKenzie et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Twenty-first Day of September, 2010

David J. Kappos
*Director of the United States Patent and Trademark Office*